United States Patent
Trionfetti et al.

(10) Patent No.: US 7,430,916 B2
(45) Date of Patent: Oct. 7, 2008

(54) APPARATUS FOR DETECTING VIBRATIONS IN A MACHINE TOOL

(75) Inventors: Gianni Trionfetti, Agrate Brianza (IT); Andrea Guidotti, Carugate (IT)

(73) Assignee: Balance Systems S.r.l., Milano (IT)

( * ) Notice: Subject to any disclaimer, the term of this patent is extended or adjusted under 35 U.S.C. 154(b) by 321 days.

(21) Appl. No.: 11/180,903

(22) Filed: Jul. 14, 2005

(65) Prior Publication Data
US 2006/0016269 A1      Jan. 26, 2006

(30) Foreign Application Priority Data
Jul. 20, 2004    (EP) .................................. 04425542

(51) Int. Cl.
    *G01N 29/00*    (2006.01)
(52) U.S. Cl. .............................. 73/660; 73/460; 73/470; 73/663
(58) Field of Classification Search .............. 73/660, 73/663, 666, 66, 468, 470, 460; 451/21, 451/343
    See application file for complete search history.

(56) References Cited

U.S. PATENT DOCUMENTS 3,761,989 A * 10/1973 Gore ........................ 15/104.92
4,397,188 A * 8/1983 Bansevichus et al. ......... 73/651
4,905,419 A * 3/1990 Makarov et al. ............... 451/21
5,125,188 A * 6/1992 Ogawa et al. .................. 451/5
5,663,504 A * 9/1997 Kluft ............................ 73/660
5,688,160 A * 11/1997 Pozzetti et al. ................. 451/5
6,062,948 A * 5/2000 Schiff et al. ..................... 451/9
6,848,315 B2 * 2/2005 Matsuki et al. ............... 73/651
6,888,288 B2 * 5/2005 Seki et al. .............. 310/323.16
7,066,028 B2 * 6/2006 Dondi ........................ 73/649

FOREIGN PATENT DOCUMENTS

| EP | 0604391 A2 | 6/1994 |
| JP | 02124264 | 5/1990 |
| JP | 05016058 | 1/1993 |
| JP | 200233368 | 8/2000 |
| WO | WO 03/073051 | * 9/2003 |

* cited by examiner

*Primary Examiner*—Hezron E. Williams
*Assistant Examiner*—Jacques M. Saint-Surin
(74) *Attorney, Agent, or Firm*—Browdy and Neimark

(57) ABSTRACT

Provided herein is an apparatus for detecting vibrations in a machine tool having a rotor portion (2) which is provided with tool members (5) and defines an axis of rotation (2*a*), the apparatus comprising a sensor assembly (3) which is able to rotate together with the rotor portion (2) and is designed to issue signals correlated to the vibrations, and a supporting and amplification device (6) for supporting the sensor assembly (3) and for amplifying the vibrations, which is set between the sensor assembly (3) and the rotor portion (2) and has a rotational asymmetry about the axis of rotation (2*a*) for any angle smaller than a full circle.

15 Claims, 4 Drawing Sheets

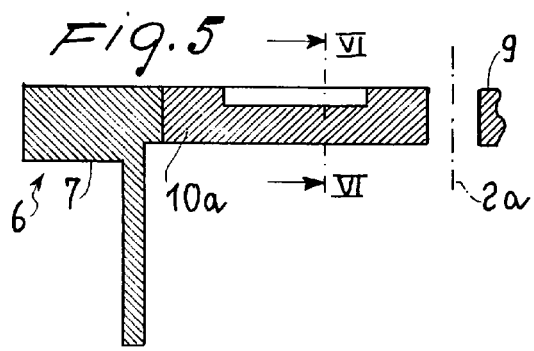
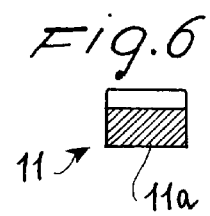
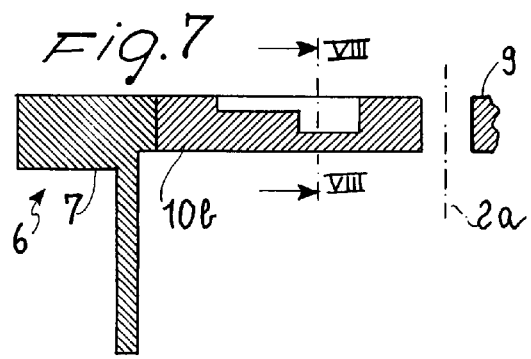
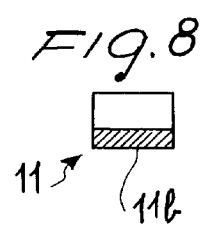
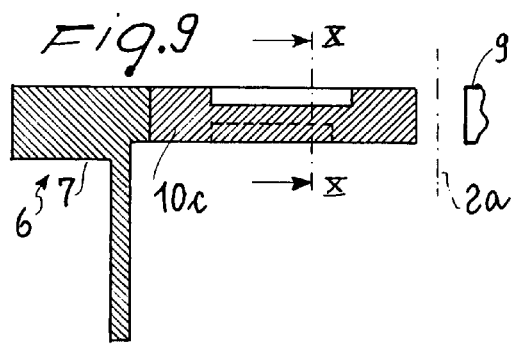
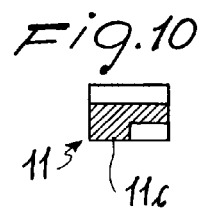

APPARATUS FOR DETECTING VIBRATIONS IN A MACHINE TOOL

FIELD OF THE INVENTION

The subject of the present invention is an apparatus for detecting vibrations in a machine tool having one rotor portion provided with tool members and defining an axis of rotation, the apparatus being of the type comprising a sensor assembly which rotates together with the said rotor portion and which is designed to issue signals correlated to the vibrations.

DESCRIPTION OF THE PRIOR ART

As is known, there exist machine tools including apparatuses and devices that convert the vibrations of the tools into electrical signals, by means of piezoelectric devices or the like. The electrical signal is then communicated to the control center of the machine, which can issue a command for stopping the tool or any other desired commands.

Amongst said apparatuses, of major importance are the ones designed for detecting contacts between the tool and the workpiece.

The above apparatuses are particularly useful because they can eliminate loadless rotation of the tools, with significant savings in terms of time required for machining each workpiece, prevent undesirable and unexpected collisions of the tools as they turn, detect the relative positions of the tools and the workpieces, etc.

Furthermore, one of the fundamental advantages of said apparatuses is to enable an optimization in the quality of finish of the machined pieces, which is particularly required for workpieces designed for structural uses, for instance frames and machine members, such as gears and the like, beams, etc. An example of use of said apparatuses is in the grinding of gears, which is obtained by means of an appropriate grinding wheel.

In this case, machining of the groove present between two teeth of a gear is particularly problematical. In fact, the abrasive grinding wheel must reach the working position with precision, via gradual displacements and inevitable contacts with the edges of the two teeth.

Whenever the grinding wheel touches the teeth of the gear, it leaves small impressions, and the sensitivity in the step of skimming of the workpiece is a determining factor for minimizing or preventing altogether impressions on the end product, and for increasing the quality of the surface finish, which is one of the fundamental requirements of the product.

Precisely for the purpose of improving the quality of the surface finish, there have been devised and produced sensors that are increasingly precise and have increasingly short response times and increasingly high levels of sensitivity.

The sensors present in the apparatuses in question are usually constrained to the spindle of the machine tool by means of appropriate flanges and clamping elements, which transmit, in particular, the vibrations due to the contact between the tool and the workpiece. The known art referred to above presents some important drawbacks. In fact, sensors, even ones built according to very advanced technical solutions, at times do not present an adequate sensitivity to the vibrations caused by the contact of the tool with the rotating workpiece.

A fundamental cause of the above drawbacks is represented by the fact that very often the vibrations coming from the tool are not transmitted correctly to the sensors, which hence perceive to a greater extent the spurious vibrations coming from areas close to the sensor itself.

The situation is further worsened by the presence, often in an area strictly adjacent to the sensor, of balancers or equalizers, i.e., devices designed to eliminate in short times any eccentricity of the tools.

The presence of said balancers dampens considerably the vibrations transmitted to the sensor, which is thus no longer able to guarantee an adequate finish of the workpiece.

A possible solution could be to attempt to reduce the problem by calibrating the sensors so as to obtain a very high sensitivity thereof, but by doing so there may also occur cases of erroneous detection due to the vibrations caused by the mechanical members and to the noises generated by the electromagnetic emissions resulting from actuation of the mechanical parts in relative motion, said emissions being moreover present also within the body of the sensor itself.

There consequently remains unsolved the technical problem of how to obtain an apparatus for detecting vibrations which presents adequate sensitivity and response times and which does not result in erroneous detection.

SUMMARY OF THE INVENTION

In this situation, the technical task underlying the present invention is to devise an apparatus for detecting vibrations which will enable the drawbacks mentioned above to be substantially overcome.

Within said technical task, an important aim of the invention is to provide an apparatus for detecting vibrations that will be able to perceive adequately the vibrations sought, without being affected by spurious vibrations.

A further aim of the invention is to provide an apparatus for detecting vibrations that will enable an adequate transmission of the vibrations sought to the sensor member.

Not the least important aim of the invention is to provide an apparatus that will enable a balancing device to be added to the tool without worsening detection by the sensor of the vibrations sought.

The technical task and the aims specified are achieved by an apparatus for detecting vibrations in a machine tool having at least one rotor portion provided with tool members and defining an axis of rotation, said apparatus comprising: a sensor assembly which is able to rotate together with said rotor portion and is designed to issue signals correlated to vibrations, and a supporting and amplification device, for supporting said sensor assembly and for amplifying said vibrations, which is set between said sensor assembly and said rotor portion and has a rotational asymmetry about said axis of rotation for any angle smaller than a full circle.

BRIEF DESCRIPTION OF THE DRAWINGS

Further characteristics and advantages of the invention will emerge more clearly in what follows from the detailed description of a preferred embodiment of the invention, with reference to the annexed drawings, in which:

FIG. 5 is a cross-sectional view according to the plane V-V appearing in FIG. 4;

FIG. 6 is a schematic view of a portion of the detail of FIG. 5, sectioned according to the plane VI-VI;

FIG. 7 is a cross-sectional view according to the plane VII-VII appearing in FIG. 4;

FIG. 8 represents a portion of the detail of FIG. 7, sectioned according to the plane VIII-VIII;

FIG. 9 is a cross-sectional view according to the plane IX-IX appearing in FIG. 4; and FIG. 10 is a portion of the detail of FIG. 9, sectioned according to the plane X-X.

DESCRIPTION OF THE PREFERRED EMBODIMENTS

Figure 1:
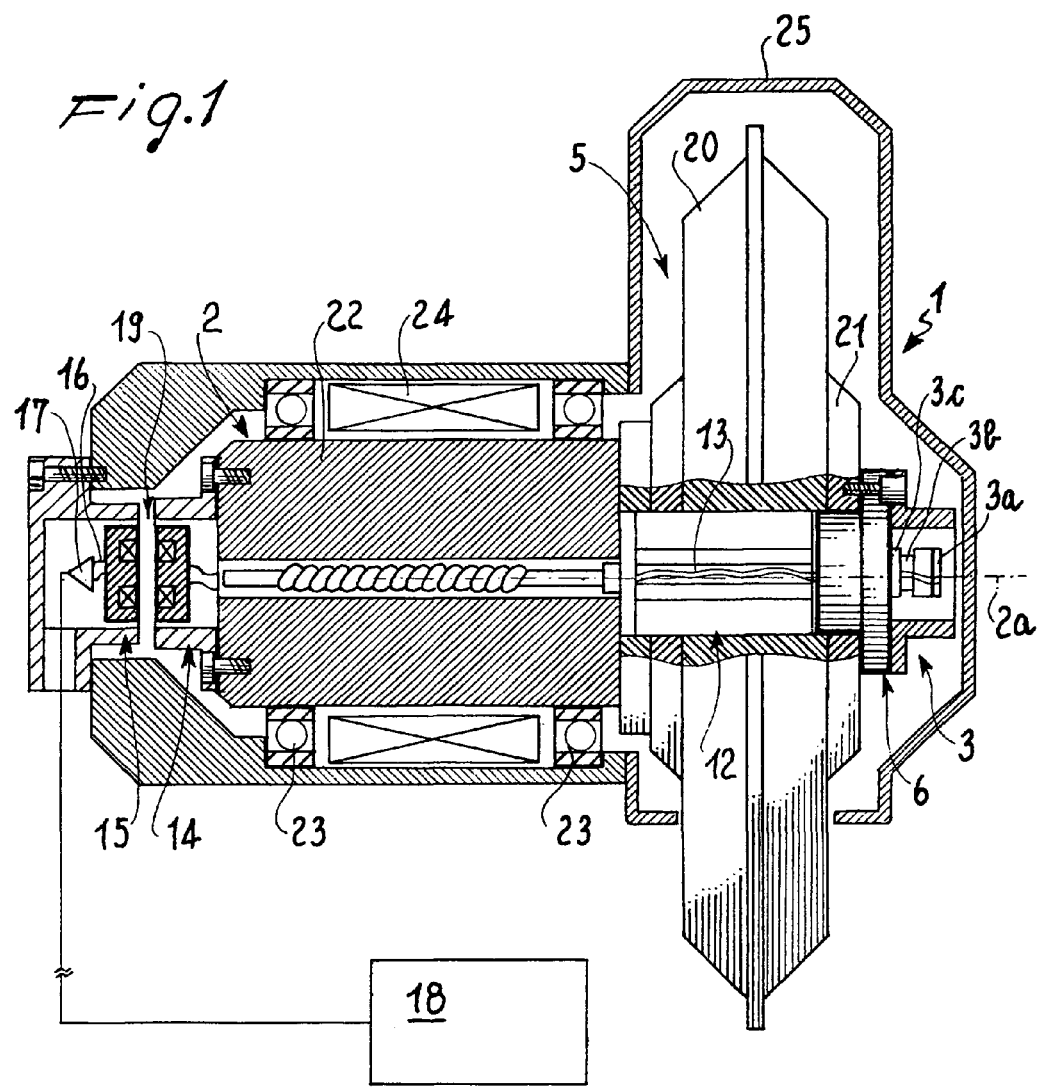
FIG. 1 is an overall view of the apparatus according to the invention set in a grinding machine.

With reference to the above Figures, the apparatus according to the invention is designated as a whole by the reference number 1.

It comprises a sensor assembly 3, designed to sense the vibrations and to transmit them in the form of correlated electrical impulses.

Said apparatus 1 is included in a machine tool 4, comprising a rotating rotor portion 2, which defines an axis of rotation 2a and includes tool members 5. The sensor assembly 3 is fixed to the rotor portion 2 by means of a supporting and amplification device 6 for amplifying the vibrations coming from the tool members 5.

The device 6 structurally presents a rotational asymmetry, about the axis of rotation 2a, for any angle smaller than a full circle.

An object is defined as being provided with rotational asymmetry for a given angle if it is possible to distinguish that a rotation thereof has occurred through the given angle.

Any object is symmetrical for rotations through 360°, i.e., a full circle. The device 6 is preferably constituted by a flange, which comprises a peripheral portion 7 formed by a ring with holes 8 purposely provided to constrain said flange both to the tool members 5 and to a more central stretch of the rotor portion 2, such as the spindle, by means of screws or the like.

The flange 6 further comprises a central portion 9, on which there can be engaged the sensor assembly 3, and also said central portion 9 is constituted by a ring, threaded at the center for supporting the sensor assembly 3.

The peripheral portion 7 and central portion 9 are preferably connected to one another by means of one or more spokes 10.

The spokes 10 structurally present rotational asymmetry, about the axis of rotation 2a, for any angle smaller than a full circle.

The asymmetry of the spokes 10 can take different forms: they can be equal to one another and arranged asymmetrically or arranged symmetrically but differentiated from one another in one or more characteristics, such as the shape, the size and the material.

Said asymmetry is obtained preferably by means of thinning of at least one of said spokes 10 and is hence defined by at least one weakened spoke 10b.

In the drawings, the spokes 10 are diversified in an area corresponding to the respective median sections 11, i.e., the cross sections taken in a direction perpendicular to the respective directions of prevalent development in areas located at a substantially median distance between the peripheral portion 7 and the central portion 9.

The weakened spoke 10b appropriately has a respective weakened median section 11b of a substantially quadrangular shape.

For example, in the presence of a maximum diameter of the flange 6 of roughly 100-120 mm, said weakened median section preferably has a thickness, parallel to the axis of rotation 2a, of between 1.5 and 2.5 mm and a width, in the plane of circumferential development of the flange, in a direction perpendicular to the axis of rotation 2a, of between approximately 8 and 12 mm.

Conveniently, the spokes 10 are three and are set apart from one another by an angle of 120°, and moreover have median sections 11 of different shapes and surface development.

Highlighted in the drawings is a first spoke 10a, which provides a referencespoke and has a first median section 11a having a substantially quadrangular shape and being made in a way substantially corresponding to the normal and commonly used spokes of a flange.

For example, once again in the presence of a maximum diameter of the flange 6 of roughly 100-120 mm, the first spoke or reference spoke 10a has a first median section 11a that is substantially rectangular, with a thickness, parallel to the axis of rotation 2a, of between 6 and 8 mm and a width, in the plane of circumferential development of the flange, in adirection perpendicular to the axis of rotation 2a, of between approximately 8 and 12 mm.

The subsequent second spoke 11b—corresponding to said weakened spoke—and third spoke 10c have, respectively, a second median section11b—corresponding to said weakened median section—and a third median section 11c that originally have shapes and surfaces that are different from one another and preferably also different from the first median section 11a of the first spoke 10a.

In practice, the second median section 11b has the dimensions described above for said weakened median section and is in practice a markedly thinned section as regards thickness.

The third median section 11c is L-shaped or bracket-shaped and has a surface greater than that of the second median section 11b and near to that of the first section 11a. On account of this substantially bracket-like shape, the third spoke 10c can be defined as a stiffened spoke.

The apparatus 1 conveniently comprises within it a balancing device 12, designed to reduce or eliminate, in restricted lengths of time, any eccentricity of the tool members 5.

Said balancing device is inserted at the center of the tool members 5 and can be connected to the peripheral portion 7 of the flange 6 in such a way that it is not constrained to said flange 6 in the proximity of the sensor assembly 3.

The sensor assembly 3 is preferably constituted by an accelerometer. Said accelerometer 3 is in practice formed by a sensitive element 3a, preferably of a piezoelectric type, and means for mechanical amplification of the signals defined by a contrasting weight 3b and an elastic element 3c consisting substantially of a spring.

The sensor apparatus 1 then comprises—amongst other things—means for transmission of the signals generated by the sensor assembly 3. Said means of transmission comprise an electrical connection 13 and a transmitting element 14 for transmitting the analog signal generated by the sensitive element 3a.

Said transmitting element 14 preferably constitutes an inductive system and is formed by a ferrite cylinder with a coil wound around it designed to conduct the electric current. In practice, it constitutes a transmitting antenna.

There is then appropriately provided a receiving element 15, for receiving the signal transmitted by the transmitting element 14, which also provides an inductive system and is formed by a ferrite cylinder with a coil wound around it, designed to conduct the electric current.

A second electrical connection 16 sends the signal, at output from the receiving element 11, of an inductive type, to an electrical amplifier 17, and from there the signal reaches the electronic control circuit 18 of the tool 4. The two elements, namely, the transmitter 14 and the receiver 16, are separated from one another by a gap 19 approximately 1 mm thick.

In the drawing of FIG. 1 said machine tool 4 is constituted by a grinder, in which the tool members 5 are constituted by the grinding wheel 20, supported by packing flanges 21, and by the rotating part of the spindle 22, which runs on purposely provided rolling bearings 23.

The spindle 22 is activated preferably by means of an electrical power winding 24; otherwise, it could be activated by means of belts, pulleys or joints connected to an appropriate motor.

The tool 4 is then preferably covered by a guard 25.

Figure 2:
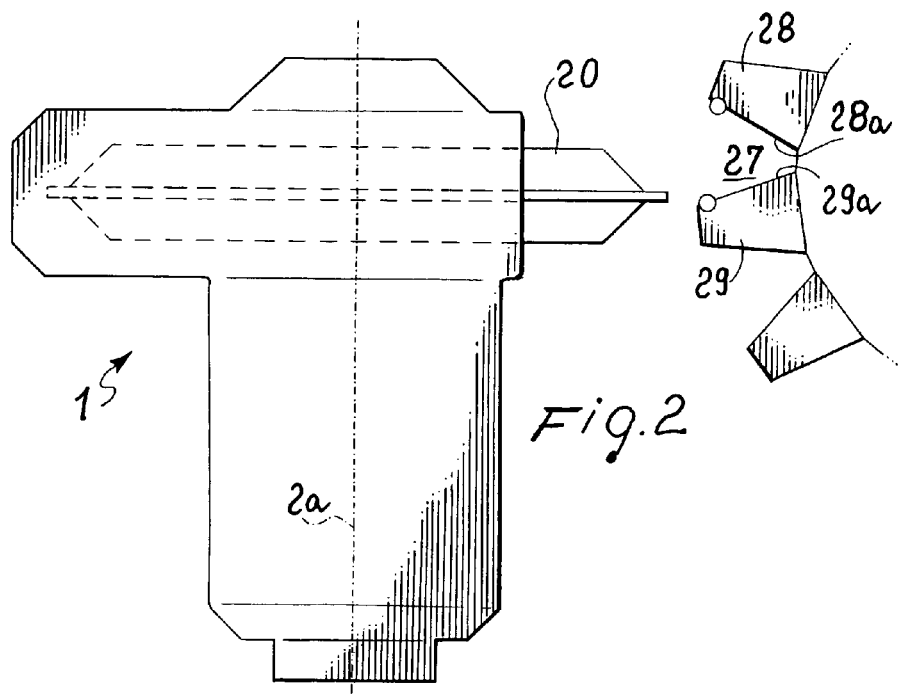
FIG. 2 is a schematic illustration of a grinding wheel, with the apparatus according to the invention, during grinding of a circular gear.
Figure 4:
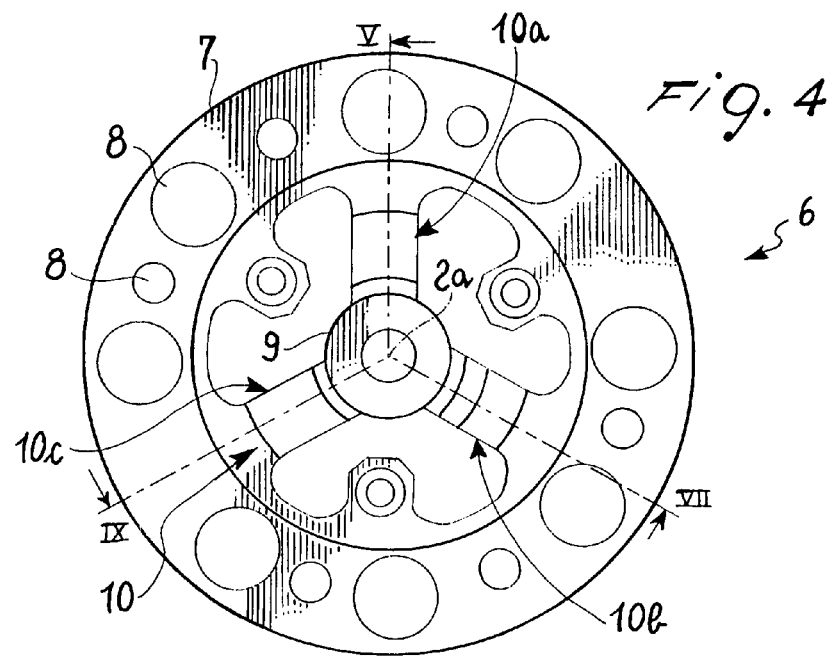
FIG. 4 highlights a detail of the apparatus according to the invention.

Also appearing in FIG. 2 is a gear 26, which, in the present description, represents the piece undergoing machining by the tool 4.

Highlighted, in particular, in the gear 26—illustrated in a schematic and simplified way—is a groove 27, surrounded by walls 28a and 29a, belonging, respectively, to teeth 28 and 29.

Operation of the apparatus is described in what follows.

The tool members 5 of the machine tool 4 are set in motion by means of the power winding 24 and, if there is perceived an eccentricity of the members 5, the balancing device 12 balances said members 5 in a short time.

The grinding wheel 20 and the gear 26, which is undergoing machining, are arranged with the respective axes of rotation that virtually intersect, forming an angle between them which depends upon the geometry of the gear 26 being machined.

The circular gear 26 is positioned so that the area momentarily undergoing machining, constituted by the teeth 28 and 29 and by the groove 27 delimited thereby, is close to the grinding wheel 20.

In order to seek the center of the groove 27 between two successive teeth 28 and 29, and carry out machining in this area, the grinding wheel 20 and the circular gear 28 translate relatively with respect to one another.

Identification of the groove 27 is possible by means of signalling of the contact made with the walls 28a and 29a of the teeth 28 and 29.

By detecting the position of the walls 28a and 29a, and hence the distance between them, it is simple to calculate the relative position of the groove 27 and the grinding wheel 20, given that a relative approach between the walls 28a and 29a is an index of the proximity of the groove 27.

The apparatus 1 has the task of sensing the contact that has been made and of transmitting the information by means of the electrical connection 13, which connects the sensor assembly 3 to the transmitting element 14.

The electrical signal transmitted then reaches the receiving element 15 and thence the second electrical connection 16, the electrical amplifier 17, and the electronic control circuit 18.

In order to detect the contact made between the grinding wheel 20 and the gear 26, the apparatus 1 exploits the sensor assembly 3.

In fact, the contact between the grinding wheel 20 and the walls 28a and 29a causes vibrations, and these are transmitted mechanically, by means of the device 6, to the piezoelectric sensitive element 3a.

The latter converts the mechanical signals into electrical signals.

In the known art prior to the technical solution of the present invention, it was found that the device 6 very often did not adequately transmit the vibrations in question and hence did not facilitate the task of the sensor assembly 3. In particular, at the point in which the sensor assembly 3 is set, the vibrations, by summation, were reduced considerably.

According to the present invention, instead, the situation changes considerably if there are provided spokes 10 arranged asymmetrically or that are structurally different from one another.

In order to describe in detail the effect of the present invention from a physic-mathematical standpoint, it is necessary to calculate the interference-wave figures caused by summation of the different vibrations, applied to the structure consisting mainly of the flange 6.

Said calculation is considerably complex and burdensome and can be handled only using complex numerical methods, for example through a finite-element model.

The situation can in actual fact be considerably and effectively simplified by comparing the spokes 10 to tensioned cords that vibrate with harmonic frequencies.

It is known that the frequencies of vibration of the latter are given by the law:

$$v = m \frac{1}{2L} \sqrt{\frac{T}{\rho_l}}$$

where v is the frequency of vibration, L is the length of the tensioned cord, T is the tension of the cord, $\rho_l$ is the linear density of the cord, and m is an integer. In the case in point, if we consider spokes of different thickness, all the variables remain unaltered, except the linear density $\rho_l$ of the cord that models a spoke 10.

Said linear density decreases proportionally to the reduction in the surface of the normal cross section of the cord or spoke 10; consequently, the frequency of vibration of said spoke 10 increases proportionally to the square root of the decrease in the surface of the normal cross section of said spoke.

The variation in the frequency of vibration of a spoke leads to a new interference figure of the vibrations.

It has been found experimentally that, in this case, the vibrations are summed at the point in which the sensor assembly 3 is set, and hence their amplitude increases.

The invention enables important advantages to be achieved.

In fact, the present apparatus 1 enables a clear recognition of the vibrations due to the contact between the tool 4 and the workpiece 26.

Said apparatus 1 maintains its advantages unaltered if there is added to the apparatus 1 a balancing device 12, which forms an aspect of fundamental importance.

Figure 3A:
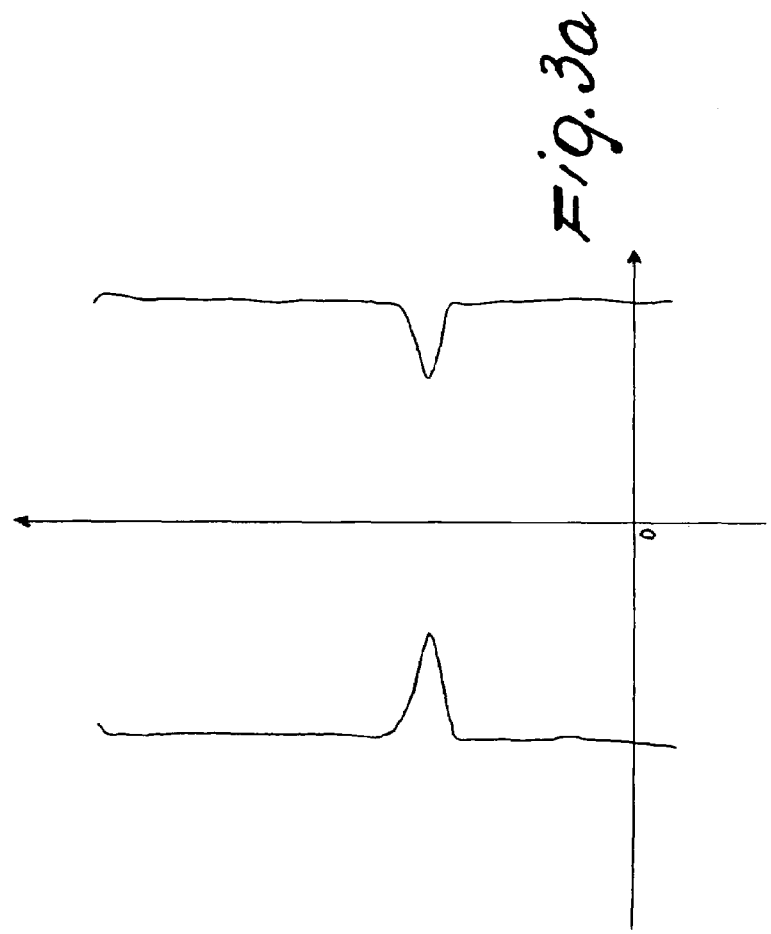
FIG. 3a is a graph which illustrates the adjustment of the profile of the sides of two teeth of a circular gear, obtained with a tool provided with an apparatus for detecting vibrations according to the known art, performed using a feeler measurement system of the Renishaw type with a ruby ball having a diameter of 3 mm, the radial co-ordinate appearing on the ordinate of the graph and the tangential co-ordinate, i.e., the surface roughness of the tooth, appearing on the abscissa.
Figure 3B:
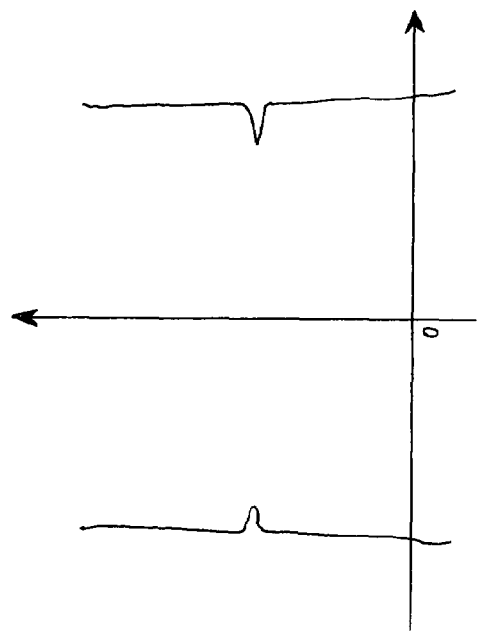
FIG. 3b illustrates adjustment of the profile of the sides of two teeth of a circular gear, obtained with a tool provided with an apparatus for detecting vibrations according to the invention, carried out with a feeler measurement system of the Renishaw type with a ruby ball having a diameter of 1.5 mm, the radial co-ordinate appearing on the ordinate of the graph and the tangential co-ordinate, i.e., the surface roughness of the tooth, appearing on the abscissa.

As evidence of the results achieved, two graphs are given in FIGS. 3a and 3b, which show the adjustment of the profiles of the walls 28a and 29a of the teeth 28 and 29, obtained using, respectively, a feeler of the Renishaw type with a ruby ball having a diameter of 3 mm and one with a ruby ball having a diameter of 1.5 mm.

The outstanding characteristic of said graphs is the presence and the height of the peaks on the abscissa. Said peaks are caused by the incisions left by the grinding wheel when it is seeking the groove 27, described previously.

The greater the height of said peaks, the deeper the incisions and consequently the poorer the finishing quality.

The graph of FIG. 3a was obtained using a tool 4 provided with an apparatus 1 with a flange of a traditional type and has a peak that corresponds to an incision of 30 to 40 μm.

The graph in FIG. 3b, instead, was obtained using a tool 4 identical to the previous one, provided with an identical apparatus, but with an asymmetrical flange 6 of the type with three spokes described previously.

Said graph of FIG. 3b has a peak that corresponds to an incision of 5 to 10 μm. There is thus achieved an improvement in precision that ranges from 300% to 700%.

A further important advantage is represented by the fact that it is possible to transmit to the sensor vibrations of the desired frequency.

It is in fact possible to calibrate the system by thinning one or more spokes, in such a way that the sensor 3 will vibrate according to a desired frequency.

From the results that emerge from the brief treatment of the phenomenon, described above and found experimentally, to obtain higher frequencies of vibration of the sensor 3 it may be sufficient to thin out the section of one of the spokes 10, i.e., that of the weakened spoke 10b.

It is therefore possible to choose a thickness of the weakened spoke 10b that will enable the sensor to vibrate in a range of frequencies of vibration outside or far from ranges of frequency of spurious vibrations.

Particularly advantageous is the choice of a range of vibrations of between 14 and 18 kHz, which is obtained by profiling the normal cross section of the weakened spoke 10b with the shape and size described above.

The apparatus 1 thus presents the additional advantage of not confusing the spurious vibrations with those due to the contact between the tool 4 and the machined piece 26.

It is moreover possible to vary the thickness of a plurality of spokes, thus obtaining different effects.

These new arrangements can further accentuate the amplitude of vibration at the point in which the sensor is located.

Particularly advantageous is the confirmation of the flange 6 with the three spokes 10a, 10b and 10c described above, where the transmission of the vibrations is diversified, also partially stiffening, with a bracket-like shape, the shape of the section 11c of the third spoke 10c.

The invention may undergo variations which fall within the scope of the inventive idea. For example, the flange 6 can be connected to the sensor assembly 3 or to the rotor portion 2 by means of fits and the like. Furthermore, is the asymmetry of the flange 6 itself may be obtained thanks to a disposition of the central portion 9 not concentric with the peripheral portion 7.

The machine tool 4, represented here by a grinding machine for gears, may be any other category of grinders (ones for plane surfaces, ones for bars, centreless ones, etc.) and of machine tools, such as lathes, milling machines, workstations, etc.

The invention claimed is:

1. An apparatus for detecting vibrations in a machine tool having at least one rotor portion (2) provided with tool members (5) and defining an axis of rotation (2a), said apparatus comprising:
   a sensor assembly (3) which is able to rotate together with said rotor portion (2) and is designed to issue signals correlated to vibrations,
   and a supporting and amplification device (6) for supporting said sensor assembly (3) and for amplifying said vibrations, which is set between said sensor assembly (3) and said rotor portion (2) wherein said device (6) is made structurally as a unit and within itself rotational asymmetry about said axis of rotation (2a) for any angle smaller than a full circle.

2. The apparatus according to claim 1, in which said supporting and amplification device (6) is a flange comprising: a peripheral portion (7) which can be engaged to said rotor portion (2), a central portion (9) which can be engaged to said sensor assembly (3), and at least one spoke (10) which develops between said peripheral portion (7) and said central portion (9).

3. The apparatus according to claim 2, in which there is a plurality of spokes (10) having respective directions of prevalent development that extend between said peripheral portion (7) and said central portion (9), and in which said spokes (10) have median sections (11) at least in part different from one another, each of said median sections (11) being obtained transversely to one of said directions of prevalent development and in a position substantially median between said peripheral portion (7) and said central portion (9).

4. An apparatus for detecting vibrations in a machine tool having at least one rotor portion (2) provided with tool members (5) and defining an axis of rotation (2a), said apparatus comprising:
   a sensor assembly (3) which is able to rotate together with said rotor portion (2) and is designed to issue signals correlated to vibrations,
   and a supporting and amplification device (6) for supporting said sensor assembly (3) and for amplifying said vibrations, which is set between said sensor assembly (3) and said rotor portion (2);
   wherein said supporting and amplification device is a flange having a peripheral portion (7) engaged to said rotor portion (2), a central portion (9) engaged to said sensor assembly (3), and a plurality of spokes (10) extending between said peripheral portion (7) of said central portion (9);
   wherein a median section of each of said plurality of spokes has at least in part a different structural configuration from one another so as to result in the supporting and amplification device having rotational asymmetry about said axis of rotation (2a) for any angle smaller than a full circle.

5. The apparatus according to claim 4, in which said median sections (11) of said spokes (10) differ in shape from one another.

6. The apparatus according to claim 4, in which said median sections (11) of said spokes (10) differ from one another in size.

7. The apparatus according to claim 4, in which there is present a weakened spoke (10b) having a weakened median section (11a) that has the minimum surface among said median sections (11).

8. The apparatus according to claim 7, in which, in the presence of a maximum diameter of said flange (6) of between 100 and 120 mm, said weakened median section (11b) has a thickness, parallel to said axis of rotation (2a), comprised substantially between 1.5 and 2.5 mm and a width, in a direction perpendicular to said axis of rotation (2a), comprised substantially between 8 and 12 mm, said weakened spoke (11b) being designed to amplify vibrations of frequency of between 14 and 18 kHz.

9. The apparatus according to claim 4, in which there are provided a first spoke (10a) having a first median section (11a) that is substantially quadrangular, and a second spoke (10b) and a third spoke (10c) having, respectively, a second median section (11b) and a third median section (11c) with shapes different from one another and with surfaces substantially smaller than that of said first median section (11a).

10. The apparatus according to claim 9, in which said second spoke (10b) has a respective second median section (11b) that is substantially quadrangular, and in which said third spoke (11c) has a respective third median section (11c) shaped like a bracket.

11. The apparatus according to claim 4, comprising a balancing device (12) designed to reduce any imbalance of said tool members (5).

12. The apparatus according to claim 4, in which said sensor assembly (3) is substantially an accelerometer.

13. The apparatus according to claim 4, in which said tool members (5) comprise a grinding wheel and said machine tool is a grinder.

14. The apparatus according to claim 4, wherein the different structural configuration is a cross section of the median section.

15. An apparatus for detecting vibrations in a machine tool having at least one rotor portion (2) provided with tool members (5) and defining an axis of rotation (2a), said apparatus comprising:
- a sensor assembly (3) which is able to rotate together with said rotor portion (2) and is designed to issue signals correlated to vibrations,
- and a supporting and amplification device (6) for supporting said sensor assembly (3).and for amplifying said vibrations, which is set between said sensor assembly (3) and said rotor portion (2);
- wherein said supporting and amplification device has a plurality of spokes,
- wherein a cross section of a median section of at least one of said plurality of spokes is different from the remaining spokes so as to result in the supporting and amplification device having rotational asymmetry about said axis of rotation for any angle smaller than zero.

* * * * *